May 20, 1958  J. MIHALYI  2,835,787
MAGAZINE-LOADING FLASH HOLDER
Filed June 24, 1953  5 Sheets-Sheet 1

Joseph Mihalyi
INVENTOR.

May 20, 1958     J. MIHALYI     2,835,787
MAGAZINE-LOADING FLASH HOLDER
Filed June 24, 1953     5 Sheets-Sheet 2

Joseph Mihalyi
INVENTOR.

BY
ATTORNEYS

May 20, 1958     J. MIHALYI     2,835,787
MAGAZINE-LOADING FLASH HOLDER
Filed June 24, 1953     5 Sheets-Sheet 3

Joseph Mihalyi
INVENTOR.
BY
ATTORNEYS

May 20, 1958  J. MIHALYI  2,835,787
MAGAZINE-LOADING FLASH HOLDER
Filed June 24, 1953  5 Sheets-Sheet 5

Joseph Mihalyi
INVENTOR.

BY Daniel J. Mayne,

ATTORNEYS

United States Patent Office 2,835,787
Patented May 20, 1958

2,835,787

MAGAZINE-LOADING FLASH HOLDER

Joseph Mihalyi, Rochester, N. Y., assignor to Eastman Kodak Company, Rochester, N. Y., a corporation of New Jersey Application June 24, 1953, Serial No. 363,863

11 Claims. (Cl. 240—1.3)

The present invention relates to flash phtography, and particularly to an improved flash holder capable of automatically or semi-automatically changing flash lamps.

The importance of photoflash lamps using the expendable metallic or pyrophoric source in a conventional glass envelope with metal base has been growing steadily to a very important position in the field of still photography. One of the main concerns of photographers has been the size of the flash lamps and the bulk involved in carrying a number of them on a photographic assignment. In answer to this problem, the lamp manufacturers have periodically come out with some reduction in lamp size, and only recently there has appeared on the market a sub-miniature flash lamp which is comparable in size to a shell peanut. Further efforts are being made to further reduce the size and cost of flash lamps.

Another concern to photographers has been the problem of changing hot lamps between exposures and disposing of the burned-out lamps. In this respect, the danger of burning one's self in changing lamps or dropping hot lamps where they can be picked up by children or will mark what they fall on have been problems, but the main problem in this respect has been the time consumed in changing lamps between exposures. This time element, when added to the time required to wind the film and set the shutter, is significant, particularly in instances when the photographer is interested in taking a series of pictures in rapid succession, i. e. weddings, sporting events, pictures of small children.

While different types of spring-actuated lamp ejectors have been devised for use on flash holders or flash guns to speed up, and reduce the danger of burning one's fingers during the changing of lamps, the recommended use of a safety flash guard on the reflector has been a step in the wrong direction because it meant that the guard must be taken off and replaced each time a lamp was flashed. The use of such a flash guard is now universally recommended, particularly for closeups, because occasionally a flash lamp explodes upon being fired and the flying glass is a potential danger.

The primary object of the present invention is the provision of a magazine-loading flash holder or flash gun which permits an automatic changing of lamps and overcomes all of the above-noted disadvantages of conventional flash holders.

Another object is to provide a flash holder which is adapted to contain a supply of flash lamps which can be successively moved into firing position in the reflector by manual operation of a lamp changer.

A further object is to provide a flash holder of the type described wherein the lamps are held in firing position by a gripping means which permits a burned lamp to be ejected from firing position by movement of a succeeding lamp into firing position.

And yet another object is to provide a flash guard for the reflector of the flash holder which contains a pocket extending below the reflector which is adapted to catch and retain a plurality of burned lamps so that it is not necessary to remove the flash guard between exposures in order to change the lamps. This pocket can be designed to hold at least eight or twelve lamps, the amount necessary to expose a complete roll of film, or the pocket can be provided with an exit from which lamps can be periodically extracted from the pocket without ever removing the guard from the reflector.

A further object is to provide a flash holder in which the reflector is provided with an opening through which the lamps are forced into firing position from the supply magazine and the provision of a hinged door having a reflecting surface which normally covers this opening. This door drops behind a lamp after it moves into firing position and serves two very useful purposes. Its reflecting surface covers the opening in the reflector and completes the reflecting surface thereof and also prevents sympathetic firing of the lamps remaining in the magazine when the lamp in firing position is fired.

And yet another object is to provide a flash holder which is adapted to interchangeably receive a special package of lamps which will act as a magazine from which the lamps can be fed in the same manner as if the lamps were loaded into a magazine forming a part of the flash holder proper.

And still another object is to provide a special package for flash lamps which retains them in stacked side-by-side relation, has an opening covered by a frangible seal which is adapted to be broken when a lamp is pushed thereagainst by the lamp changer of the flash holder, is provided with an opening through which the lamp changer of the flash holder may move to engage and push a lamp into firing position, and includes slots to permit a spring-pressed plunger of the holder to engage the uppermost lamp of the stack to feed the succeeding lamps into firing position.

The novel characteristics that I consider characteristic of my invention are set forth with particularity in the appended claims. The invention itself, both as to its organization and its methods of operation, together with additional objects and advantages thereof, will best be understood from the following description when read in connection with the accompanying drawings in which:

Fig. 8 is a perspective view showing the lamp package of Fig 6 from the top front corner;

Fig 9 is a perspective view of the lower end of either of the lamp packages and showing how the front wall of the package may be provided with a frangible opening which will readily rupture under pressure to permit exit of the lowermost lamp of the stack;

Fig. 10 is a view similar to Fig. 9 and showing how this frangible opening is broken and opened by a lamp being pressed against the same;

Fig. 11 is a top plan view of the magazine or lamp receptacle of the flash holder, and showing a particular configuration therefor to insure against the lamp package being inserted into the magazine back-side to;

Fig. 12 is a top plan view of a lamp package which has its side walls inclined to the front and back walls and is adapted to cooperate with the magazine of the type shown in Fig. 11 to prevent the package from being inserted into the receptacle or magazine back-side to;

Generally speaking, the flash holder constituting the present invention comprises a hollow casing for containing the power supply and serving as a hand grip for the entire unit, a lamp receptacle or magazine for holding a plurality of flash lamps in side-by-side stacked relation, a reflector attached to the wall of said receptacle, a manually operated lamp changer, a spring-loaded plunger for pressing the stack of lamps into the path of the changer, and a flash guard on the front of the reflector including a pocket portion adapted to catch and retain a plurality of burned lamps. When the lamp changer is operated, it pushes the lowermost lamp in the stack through alined openings in the receptacle and reflector and into engagement with a pair of electrical contacts which frictionally and electrically engage the lamp contacts and locate the lamp in proper optical relation to the reflector. During this loading operation any lamp which might have been in firing position will be forced out of contacts and will fall into the pocket of the flash guard. A hinged door permits a lamp to be moved into the reflector and immediately closes, whereupon a reflecting surface thereon completes the reflecting surface of the reflector and the door itself prevents the lamps remaining in the receptacle from being sympathetically set off by firing of the lamps in firing position. As the lamp changer is allowed to return to its inoperative position, the stack of lamps moves down to position the next lamp in loaded position. While the flash holder proper can be designed so that its lamp receptacle or magazine is adapted to be loaded with loose lamps, it can also be designed to interchangeably accept a special package of lamps which can be inserted into the receptacle and the lamps fed therefrom in the manner disclosed. This special lamp package is also a feature of the present invention.

The preferred embodiment of my magazine-loaded flash holder is based arbitrarily on the use of flash lamps made up in the form of glass cylinders having substantially spherical ends provided with metal caps or protuberances which provide one or both contacts for the battery circuit. Four different embodiments of such flash lamps are shown in Figs. 13–16 although as the description of the present invention proceeds it will be understood that my novel flash holder is not limited to the use of flash lamps of this particular construction. Each of the four embodiments of lamps is similar in outside appearance and construction. Each lamp has a large opening at one end so that foil can be filled into the bulb, and then enclosed with an end cap into which one or both terminal leads are fused. The end cap is then cemented airtight to the glass bulb. The other end of each lamp, has a small opening for evacuating air from the lamp, and this hole is fused over to tightly seal the lamp. Electrical contact caps are cemented to each end of the flash lamp.

Figure 13:
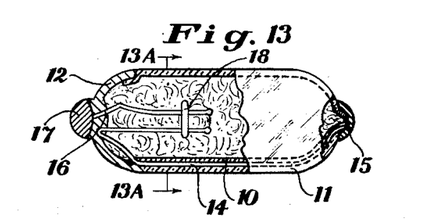
Fig. 13 is an enlarged side view, partly in section, showing one embodiment of flash lamp adapted for use in the present flash holder.
Figure 13A:
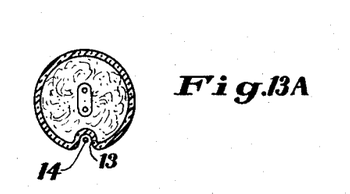
Fig. 13A is a section taken substantially on line 13A—13A of Fig. 13.

In the embodiment shown in Figs. 13 and 13A, foil 10 is enclosed by glass bulb 11 and an end cap 12 made of an insulating material. Bulb 11 has a groove 13 molded into its entire length for terminal lead 14 which is placed outside of the glass bulb 11 and fits into groove 13 connected to soldered contact 15. Terminal lead 16 fused into end cap 12 connects to soldered contact 17. Terminal leads 14 and 16 are separated within the bulb by an insulator 18. Solder contacts 15 and 17 are cemented securely to each end of the flash lamp.

Figure 15:
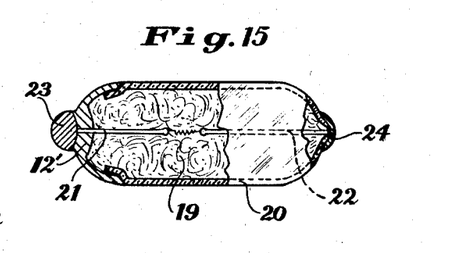
Figs. 15 and 16 are enlarged side views, partly in section, showing other embodiments of flash lamps having the electrical contacts at opposite ends thereof.

In the Fig. 15 embodiment, foil 19 is enclosed in a glass bulb 20. Terminal lead 21 is fused into insulating end gap 12' and is connected to soldered contact 23. Terminal lead 22 passes through a hole in glass bulb 20 and after the hole is fused closed is connected to soldered end contact 24. Again, solder contacts 23 and 24 are cemented securely to each end of the flash lamp.

Figure 16:
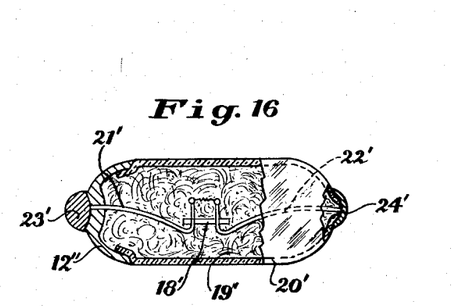

In the Fig. 16 embodiment, foil 19' is enclosed in a glass bulb 20'. Terminal lead 21' passes through a hole in the end cap 12" and connects to soldered contact 23'. Terminal lead 22' passes through a hole in glass bulb 20', and, after the hole is fused, connects to soldered end contact 24'. Terminal leads 21' and 22' are separated by insulator 18'.

Figure 14:
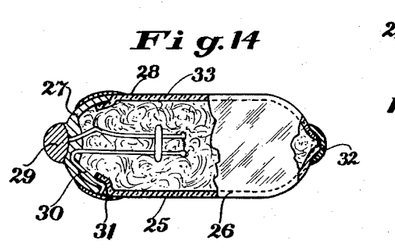
Fig. 14 is an enlarged side view, partly in section, of another embodiment of flash lamp having its two electrical contacts located at the same end of the lamp, as distinguished from opposite ends as in the other embodiment.

In the Fig. 14 embodiment, foil 25 is enclosed by glass bulb 26 and end caps 27. Terminal lead 28 passes through the cap 27 and is soldered to end contact 29. Terminal lead 30 is connected to metal ring 31 which is securely fastened to end cap 27 for the second electrical contact. This flash lamp differs from the other embodiments in that both electrical contacts are located at one end of the lamp. Soldered contact 32 is securely cemented to the glass bulb 26 but has no electrical function. Its only function is to cooperate with a lamp gripping means of the flash holder in such a way as to help properly position the lamp in firing position in the reflector as will be hereinafter described. Terminal leads 28 and 30 are separated by insulator 33, and again contacts 29 and 31 are cemented securely to end cap 27.

Referring now to Figs. 1–5, a flash holder constructed in accordance with a preferred embodiment of my invention comprises a hollow casing 35 molded from a plastic material and adapted to contain any conventional form of power supply means 36, i. e. dry cell batteries, a battery-capacitor unit, etc. To permit interchange of power supplies the casing may be split into two parts, as indicated by line 37, and the two parts held together by any suitable attaching means. This casing 35 also serves as the hand grip for holding the flash holder in one hand.

Figure 6:
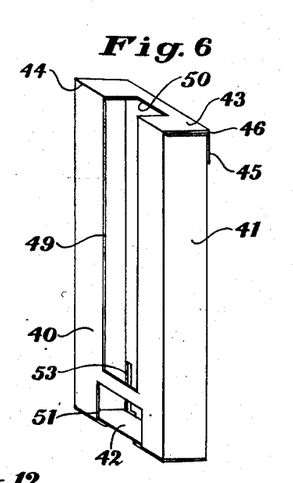
Fig. 6 is a perspective view showing one form of package for flash lamps which is adapted for use in this flash holder.
Figure 7:
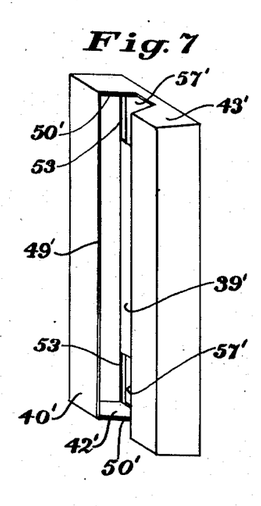
Fig. 7 is a perspective view of another embodiment of lamp package adapted for use in this flash holder.

Fixed to, and extending above, the casing 35 is an open-ended lamp receptacle or magazine 38 which is adapted to retain a plurality of flash lamps L in side-by-side stacked relation. While this receptacle or magazine 38 could be designed to be loaded with, and properly retain, individual lamps in this stacked relation, for purposes of readily handling the lamps I prefer to have them packaged in stacked relation in a special cardboard box which can be slipped into the receptacle 38 for easy loading. As shown in Figs. 6 and 7, this box can take one of two different forms. In the Fig. 6 form, which is that shown in the flash holder of Figs. 1 and 2, the box comprises top and bottom walls 39 and 40, respectively, spaced apart by side walls 41 and one end of the box closed by a double end wall 42, while the other end is closed by a flap 43 hinged at corner 44 to the rear wall and provided with a tab 45 hinged at corner 46 which terminates in an end 47 adapted to slip into a slot 48 in the top wall 39 to hold this end closed. A plurality of lamps L can be inserted into this box in side-by-side stacked relation by opening the flap 43. The dimensions of this box are such that it confines a group of lamps L in a single row in side-by-side stacked relation.

The bottom wall 40 and the end wall formed by flap 43 are provided with slots 49 and 50, respectively, which aline with one another to permit a spring-pressed plunger to extend transversely into the box and into engagement with the uppermost lamp in the stack. The bottom wall adjacent the end 42 is provided with an opening 51 through which a lamp changer in the flash holder is adapted to move to engage the lowermost lamp in the stack and push it from the box into firing position in the holder. The end of the top wall 39 adjacent end 42 of the box is provided with an opening large enough to permit the lowermost lamp in the stack to pass out of the box when pushed by the lamp changer and this opening is normally closed by a frangible seal which maintains the lamps in the box during shipping and handling, but which is adapted to break away when pressure is applied to the lamp, as will be described hereinafter. While such a sealed opening can be provided in different ways, I have shown one way in Fig. 9 in which this result can be effected during blanking out the blank for the box. Three edges of the top wall adjacent end 42 are weakened by slotting the wall as shown at 52, 53 and 54 and leaving two small tabs 55 joining this wall to the end wall. At a distance equal to the diameter of a lamp from the end wall 42, the top wall is scored or otherwise weakened to provide a fold line 56. When pressure is applied to the lowermost lamp by the lamp changer, the tabs 55 will break and that portion of the top wall below the score line 56 will fold back on this line as a door 57, as shown in Fig. 10, thereby providing an opening through which the lamp can be moved from the box.

Rather than having a box which must be placed in the receptacle 38 of the flash holder in a certain end-to-end relation as disclosed, the two ends of the box could be made symmetrical, as indicated in Fig. 7, so that either end can be inserted into the receptacle. In this embodiment, both ends of the box are permanently closed by end walls, as shown at 42' and 43', and both ends of the front wall 39' will have a frangible door 57' like that described and shown in Figs. 9 and 10. To permit operation of the presser member of the flash holder, the rear wall 40' of this box is provided with a slot 49' extending its full length and each of end walls 42' and 43' will include slots 50' alined therewith.

Figures 8, 9, 10, 11, 12:
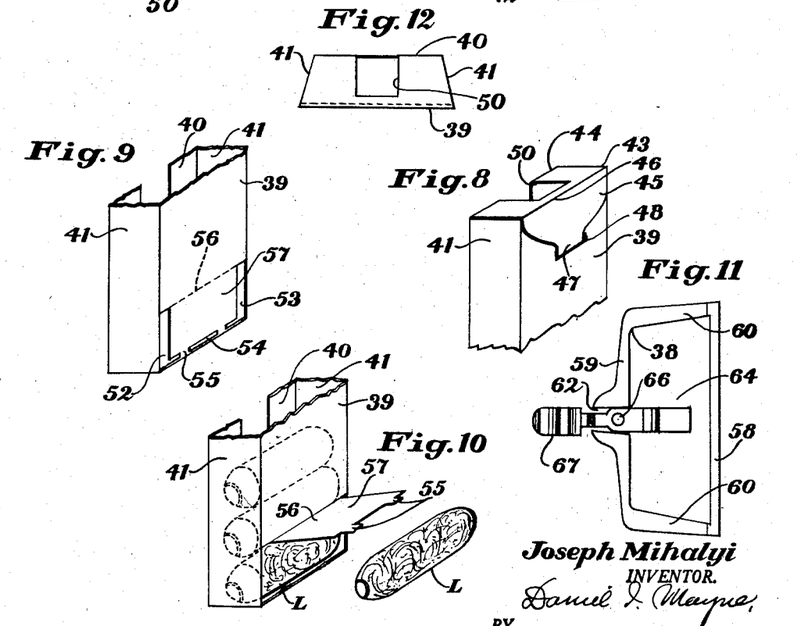

Referring again to the flash holder, if the receptacle or magazine 38 of the flash holder is to receive a package of lamps of the type set forth, then its front wall 58, its rear wall 59 and its side walls 60 are so dimensioned as to receive the box rather than being dimensioned for the lamps alone, see Fig. 11. In Fig. 12, I have shown the front and rear walls of the lamp box as being of a different width so that the side walls are inclined rearwardly rather than being square to the front and back. Such a construction might be useful to insure against the box being inserted into the flash holder receptacle backside to, or with the door 57 toward the rear wall instead of toward the front wall of the receptacle. As is shown in Fig. 11, the side walls 60 of the receptacle 38, or at least the inner surfaces thereof, will be inclined rearwardly in correspondence with the side walls of the lamp box in this instance.

Figures 1, 5:
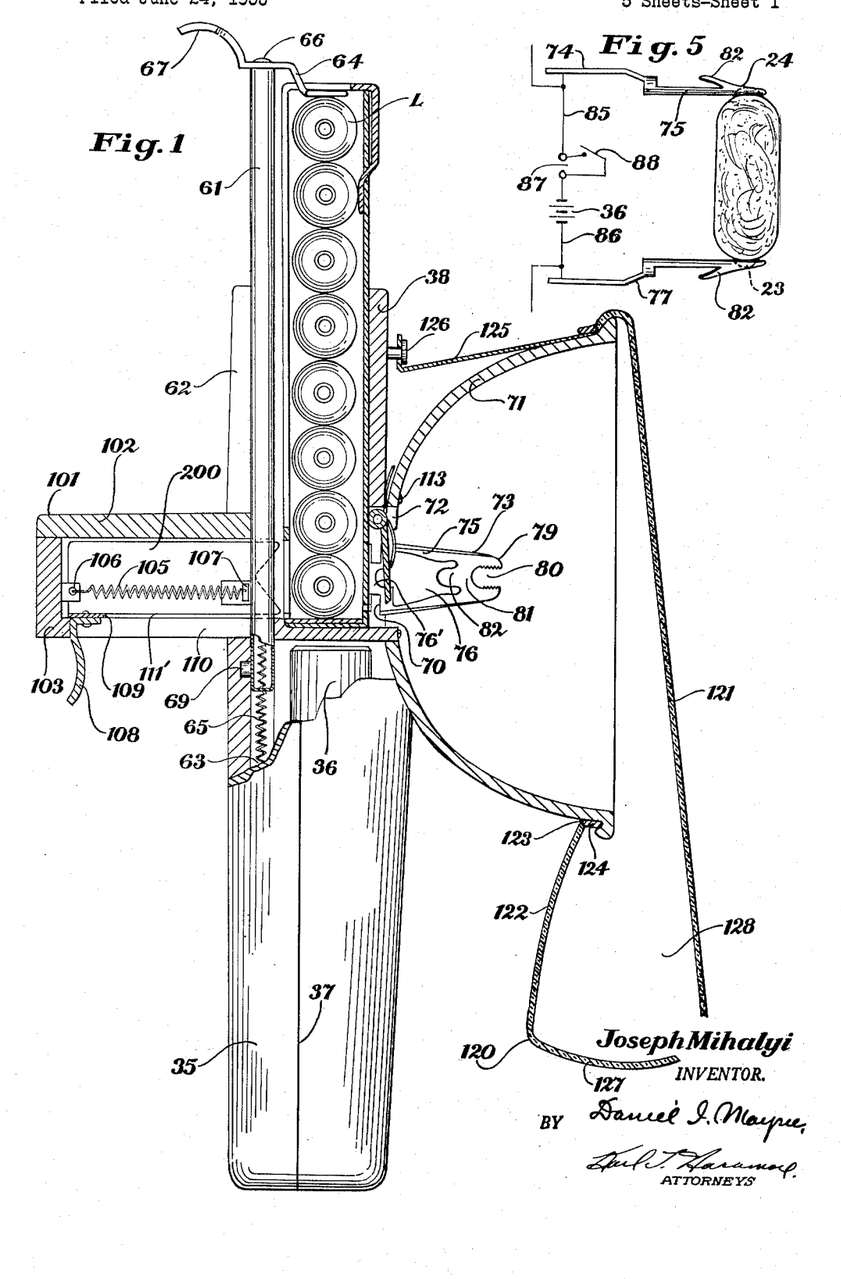
Fig. 1 is an enlarged side elevational view, partly in section, of a magazine-loading flash holder constructed in accordance with the preferred embodiment of the present invention, and showing the holder loaded with a package of new lamps.
Fig. 5 is a schematic view showing how the lamp gripping means engage a lamp when holding it in firing position and showing how said gripping means are connected into the power supply of the flash holder.
Figures 2, 2A, 3:
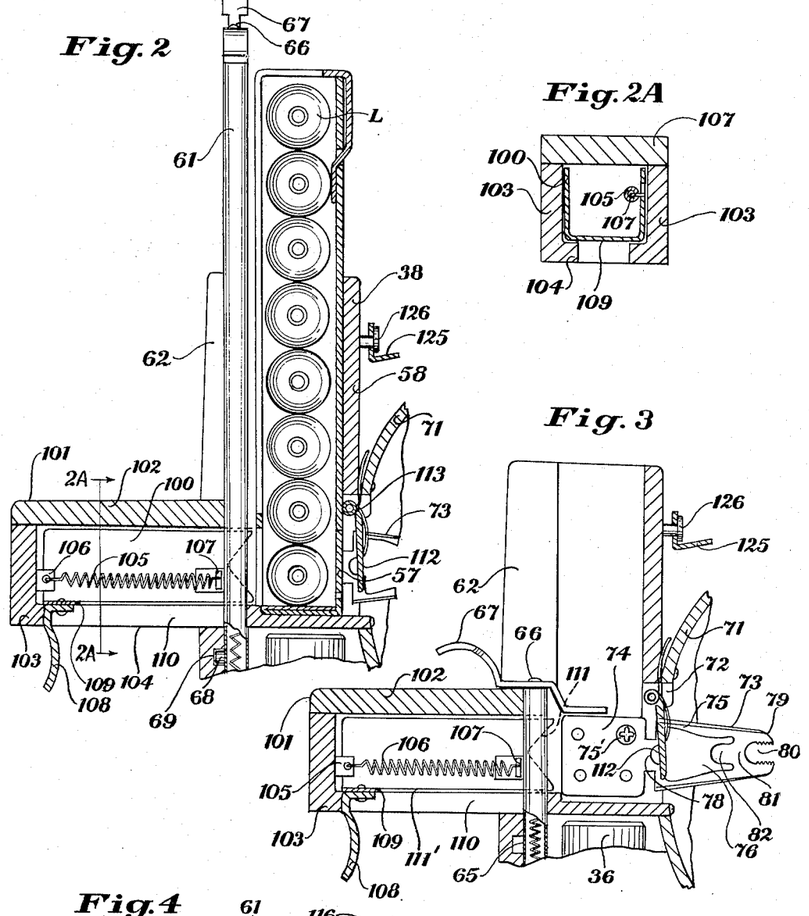
Fig. 2 is a sectional view of the magazine portion of the flash holder shown in Fig. 1, but showing the spring-pressed plunger moved to its loading position to permit the insertion of a package of lamps into the magazine of the flash holder.
Fig. 2A is a sectional view taken substantially on line 2A—2A of Fig. 2.
Fig. 3 is a sectional view showing the magazine portion of the flash holder with no lamps in position therein.
Figure 4:
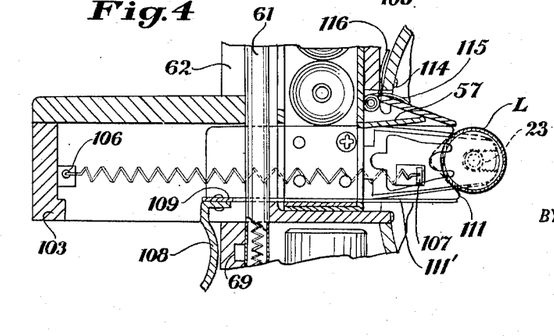
Fig. 4 is a sectional view of the magazine portion of the flash holder and showing the lamp changer moved to its operative position wherein it has moved a lamp into firing position within the reflector.

After a box of lamps is placed in the receptacle 38, a spring-loaded plunger 61, extending vertically downward through a slot 62 in the rear wall 59 and guided by a groove 63 in the rear wall of the casing 35, is swung from its extended loading position shown in Fig. 2 to its operative position, see Fig. 1, wherein a presser member 64 thereon extends through the slots 50 and 49 in the upper end and rear wall of the box of lamps to press downwardly against the uppermost lamp in the box. This plunger is normally urged downwardly by a tension spring 65 partially housed within the plunger and having one end fixed to the bottom of casing 35 and its other end fixed to the presser member by a stud 66. A fingerpiece 67 is formed on the presser member by means of which the plunger can be manually pulled up to its lamp-loading position and turned through 90°, whereupon a pin 68 extending radially from the lower end of the plunger is moved into a notch 69 in the wall of the casing to lock the plunger in its inoperative position, see Figs. 2 and 4. After the box of lamps is placed in position in the receptacle 38, the plunger is rotated 90° to its operative position wherein the presser member 64 engages the uppermost lamp in the stack and applies downward pressure thereto, by virtue of the pin 68 being removed from notch 69, see Fig. 1.

The lower end of the front wall 58 of the receptacle 38 is provided with an opening 70 which alines with the frangible door 57 in the box of lamps and is of such a size as to allow a lamp L to pass therethrough in a sidewise position. Fastened to the front wall of the receptacle 38 is a reflector 71 having an opening 72 on its axis corresponding in shape and size to the opening 70 in the receptacle wall. For guiding a flash lamp to, and for gripping it to hold it in, firing position within the reflector and to electrically connect it in circuit with the power supply, different types of gripping contacts will be used depending upon the arrangement of contacts on the particular type of flash lamps being used. In Figs. 1–4, I have shown a gripping means adapted for use with a lamp of the type shown in Figs. 13, 15 and 16, or in which the electrical contacts are at opposite ends of the lamps. This particular gripping means comprises a pair of identical contact fingers indicated generally by the numeral 73 and being fixed to opposite side walls of the receptacle and extending through openings 70 and 72 in the receptacle and reflector, respectively, and into proper optical relation with the reflector, see Figs. 1 and 5. Since each of these contact fingers 73 are identical, a description of one will suffice for both. Each finger is preferably stamped from a single piece of metal and consists of a flat mounting portion 74 by means of which it is fastened to the side wall of the receptacle 38 by screws 75'. Extending forwardly from the mounting portion and through the openings 70 and 72 is a lamp engaging portion 75 which is curved inwardly to engage the spherical ends of the lamp. Portion 75 is provided with a cut-out 76 to add to the inherent resiliency of the contact finger and to prevent the contacts 23 or 24 on the end of the lamp from engaging the finger and permit the curved portion of the finger to engage the spherical ends of the lamp and provide a grinding function. The guiding portion 75 of the finger is connected to the mounting portion by a reduced neck 76' which adds resiliency to the fingers and which neck has an offset 77 to account for the thickness of the side walls of the lamp box. This neck portion is provided with a slot 78 joining the cut-out 76 to permit free passage of the contact 23 or 24 on the end of the lamp over this offset. As is apparent from an inspection of Fig. 1, the guiding edges of the lamp engaging portion 75 taper slightly toward one another and terminate in an end 79 having a slot 80 which finally engages the lamp contacts 23 or 24 to position a lamp in firing position within the reflector, see Fig. 5. The edges of this slot 80 may be roughened as shown to cut into the lamp contacts 23 or 24 and provide a good electrical contact. The bridge 81 of lamp engaging portion 75 is left to give the finger lateral rigidity and, to permit passage of the lamp contact across the same, a turned back tab 82 is provided on this bridge which is adapted to be engaged by the contact 23 or 24 on the end of the lamp. It will be readily understood that the two contact fingers 73 are formed and mounted so that their slotted ends are normally spaced apart by a distance less than the over-all length of the lamp. As a lamp is slid from the receptacle 38 into the reflector, the lamp engaging portions 75 of the fingers 73 first engage the spherical ends of the lamp, not the contacts 23 or 24 thereon, and by virtue of their curved and tapered form, center the lamp and guide it into proper postion so that its end contacts 23 and 24 properly engage the slots 80 and are positioned thereby in proper optical relation to the reflector.

Opposite ones of these contact fingers 73 will be connected into the power supply 36 of the flash holder by any suitable form of wiring system indicated schematically in Fig. 5. Since this flash holder will probably be provided with a socket into which a cord to the built-in synchronizer switch of a shutter is to be connected, I have indicated the fingers 73 as being connected by leads 85 and 86 to a circuit including a power supply 36 and a socket 87 into which the synchronizer switch 88 of a shutter may be plugged in known fashion to control the flashing of the lamp in synchronism with the operation of the camera shutter.

Figures 17, 17A:
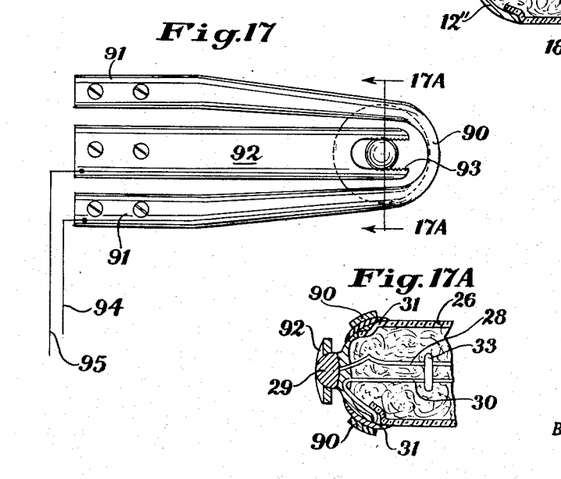
Fig. 17 is a side elevational view of another embodiment of lamp gripping means for use in a flash holder, and particularly adapted for use with lamps of the type shown in Fig. 14, or a lamp having both electrical contacts at one end.
Fig. 17A is a section taken substantially on line 17A—17A of Fig. 17.

Should flash lamps of the type shown in Fig. 14 be used, wherein both lamp contacts 29 and 31 are at one end of the lamp and the second end contact 32 is a dummy and used only for positioning purposes, then the lamp positioning contact fingers can be of the form shown in Figs. 17 and 17A. Here, as before, identical gripping means extends from opposite walls of the receptacle 38, but since both lamp contacts are at the same end of the lamp, the gripping means at each side must be adapted to electrically engage both of these contacts. As shown, such a lamp gripping means may comprise a U-shaped resilient metal contact finger 90 having both free ends 91 fastened to the wall of the receptacle by screws. As clearly shown in Fig. 17A, the arms of this gripping contact 90 are spaced apart and curved to engage the band contact 31 on the spherical end of the lamp and serve in the same guiding capacity as the lamp engaging portion 75 of the embodiment shown in Figs. 1–5. Also fixed to the wall of the receptacle by screws, but within, and spaced from, the free ends 91 of contact 90 is a second contact finger 92 having a slotted end 93 adapted to engage and frictionally grip the contact 29 or 32 on the end of the lamp. As shown in Fig. 17A, contact finger 92 is offset laterally with respect to contact finger 90, and the inherent resiliency in the two will serve the grip the lamp and hold it in firing position within the reflector. Contact fingers 90 and 92 are connected to opposite sides of the power supply 36 by leads 94 and 95. While only one set of contact fingers 90 and 92 need be connected into the power supply if the lamps are oriented in the package so that the two lamp contacts will always engage the live contact fingers, in order to adapt the flash holder for use with such lamps, regardless of their orientation in the package when packed, I propose to connect each of the corresponding contacts 90 and 92 into the power supply so that the lamp will be fired regardless of its orientation when moved into firing position.

Referring back to Figs. 1–4, the lamp changing mechanism comprises a U-shaped changer 100 normally housed in an enclosure 101 extending to the rear of the lamp receptacle or magazine 38 and consisting of a top wall 102, an end wall 103, and a bottom wall 104. This changer 100 is normally moved to its inoperative position within the enclosure by a spring 105 fixed at one end to a lug 106 on the end wall 103 and at its other end to a lug 107 struck out from one arm of the changer. By pressing with the thumb against a fingerpiece 108 fixed to the transverse wall 109 of the changer and extending through a slot 110 in the bottom wall 104 of the enclosure, the changer can be moved forward to its operative position shown in Fig. 4. During this movement the notched ends 111 of the arms of the changer engage the lowermost lamp in the stack at spaced points and push this lamp into firing position with the gripping contacts within the reflector. Pressure so applied to the first lamp of a package will suffice to break the frangible opening in the top wall of the package and allow the lamp to pass out of the package. While the changer is in its operative position, it will hold up the remaining lamps in the package, see Fig. 4, but as soon as it is allowed to return to its inoperative position, the stack of lamps will move down to the bottom of the receptacle so that the next one is in position for loading. The transverse wall of the changer is provided with a slot 111' through which the plunger 61 extends, said slot being long enough to permit the changer to move far enough to push a lamp into firing position from the magazine.

Providing a reflector with an opening in the reflecting surface results in cutting the efficiency of the same to some extent. This is a particularly significant factor when the opening 72 is on the axis of the reflector as in the present flash holder. In order to eliminate this disadvantage, I provide a door 112 which is hinged on a pintle 113 to move between a closed position wherein it practically closes the opening 72 in the reflector, see Figs. 1 and 2, and an open position, see Fig. 4, wherein it allows a lamp to pass into firing position. If the outward face of this door is provided with a reflecting surface, then in its closed position it will complete the reflecting surface of the reflector. This door will also serve to shield the lamps remaining in the receptacle and prevent them from being sympathetically fired by a flashing of the lamp in firing position. This door is normally moved to its closed position by a spring 114 wrapped around the pintle 113 and having one end 115 engaging the outer face of the door and the other end 116 engaging the front wall of the receptacle 38. Any form of stop means, not shown, might be provided to limit the movement of the door when moved to its closed position and position it so that its reflecting surface cooperates with the reflecting surface of the reflector to produce the maximum efficiency.

With this flash holder, the loading of a lamp into firing position will cause ejection of a burned lamp already in firing position. In order to provide the necessary safety guard against exploding flash lamps and to eliminate the need for removing such a guard each time a lamp is changed, I have invented a flash guard which covers the reflector and which has a pocket for catching and retaining a number of flash lamps. As shown in Fig. 1, this flash guard may comprise a bag indicated generally by numeral 120 made from a plastic material, or suitable material, the front wall 121 of which is transparent and the rear wall 122 of which is provided with an opening 123 adapted to snap over the open end of the reflector 71. In order to retain the guard on the reflector, the margin of the opening in the rear wall may have an elastic band 124 sewed in the edge and which band will snap behind the bead at the edge of the reflector to hold the guard in place. The guard may also have a strap 125 fixed to the top edge thereof for detachable connection to a button 126 on the flash holder. This strap will attach the guard to the flash holder when it is slipped off of the open end of the reflector to remove burned flash lamps. The back and front walls of the bag extend below the reflector and are joined by a bottom wall 127 to form a pocket portion 128 adapted to catch and retain a plurality of burned flash lamps as they are ejected from the firing position. This bag portion may be large enough to retain eight or even twelve flash lamps so that the guard need be taken off and emptied only when a new roll of film is required to be loaded into the camera.

Figure 18:
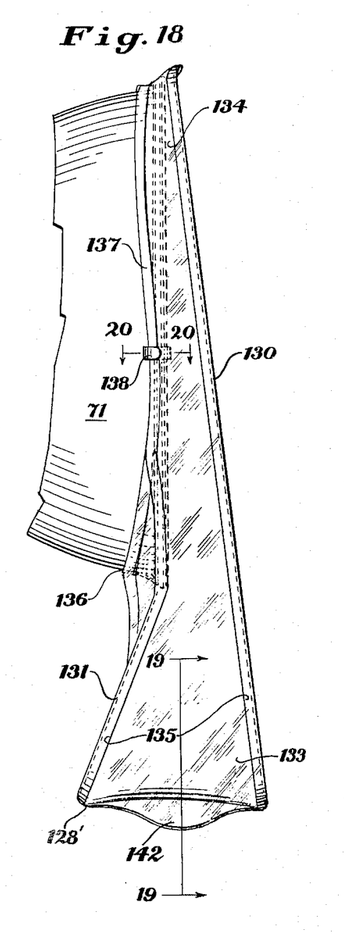
Fig. 18 is a side elevational view of one form of flash guard which can be used with the present flash holder.
Figure 19:
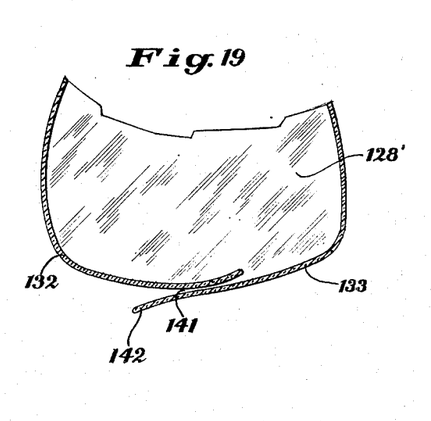
Fig. 19 is a longitudinal sectional view of the pocket portion of the flash guard shown in Fig. 18 and showing how the bottom wall may be provided with a readily opened slit to permit emptying burned lamps from the pocket.
Figure 20:
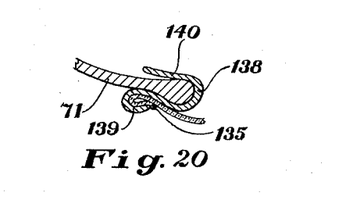
Fig. 20 is a sectional view taken substantially on line 20—20 of Fig. 18.

In Figs. 18, 19 and 20, I have shown another embodiment of flash guard which need never be taken off the reflector for emptying the burned lamps therefrom. This guard is preferably made of a plastic material as before and will have a front wall 130 which is transparent, and a back wall 131 which may be transparent or opaque. The back and front walls are joined and spaced apart by a strip of plastic which is widened out at both ends 132 and 133 from a narrow middle portion 134 to provide an enlarged pocket portion below the reflector 71. The front and rear walls are preferably fastened to the side wall by turning the edges thereof over the side wall and fastening them together by sewing, heat sealing, etc., so as to form a binding indicated by numeral 135. This binding also gives the edges of the walls some rigidity so as to hold the walls in spaced relation. The rear wall is provided with an opening 136 which is adapted to slip over the open end of the reflector to retain the guard thereon. In this form the opening 136 is provided with a hem 137 to which is fastened a pair of S-shaped clips 138 for aiding in frictionally retaining the guard in position on the reflector. As clearly shown in Fig. 20, one end 139 of the clip is squeezed onto the hem 137 while the other open end 140 extends rearwardly so as to snap over the bead around the edge of the reflector. The opening 136 is made slightly smaller than the open end of the reflector and the inherent resiliency of the plastic material is relied upon to stretch it over the reflector. Again, the lower end of the guard has a pocket portion 128', but in this embodiment, the bottom wall of the pocket is provided with a slit opening 141 which can be selectively opened to remove burned lamps from the pocket. As shown, this opening may be formed by extending the ends of the side walls into overlapping relation and leaving them free between the front and rear walls to form a slit 141, but fastening them together at the point they join the front and rear walls. This slit can be opened up to empty the lamps from the pocket by grabbing the tab portion 142 and pulling it downwardly to widen the slit. This operation will be facilitated by grabbing the front and rear walls adjacent the slit between the thumb and forefinger of one hand and squeezing them together. It will be appreciated that this is only one of many different types of openings which could be provided in the pocket portion of the guard, but it is preferred since it requires no snaps, hooks, or other closure means.

By way of résumé, the operating cycle of the present flash holder can be described thus: the package of lamps as purchased by the user is merely dropped into the lamp receptacle or magazine on the flash holder and the spring-actuated presser is twisted to its operative position. Then a simple sliding movement of the changing lever moves the first lamp from the magazine into firing position in the reflector. Subsequent operation of the changing lever inserts a new lamp and pushes the used lamp out of firing position so that it can drop into the pocket portion of the flash guard. The pocket of the flash guard is emptied after the last lamp in the magazine has been fired and the cycle is ready to repeat. This new approach to rapid flash lamp changing may be likened to the advance in small-arms design that was accomplished by abandoning muzzle loading and adapting the breach-loading cartridge that is capable of being magazine fed. While I have shown the flash holder designed to work with flash lamps having a certain form and arrangement of electrical contacts, it is pointed out that the invention is not limited by the particular type of lamps shown, but embraces the idea of providing a flash holder which can successively feed flash lamps from a magazine supply into and out of firing position by manipulation of a manual changer, regardless of the type of flash lamp used in such a procedure.

While I have shown and described certain specific embodiments of my invention, I am fully aware that many modifications thereof are possible. My invention, therefore, is not to be limited to the precise details of construction shown and described, but is intended to cover all modifications coming within the scope of the appended claims.

Having thus described by invention, what I claim is new and desire to secure by Letters Patent of the United States is:

1. In a flash holder the combination of a hollow casing adapted to contain an electrical power supply and to serve as a handle; an open-ended flash lamp receptacle atop said casing; a box containing a plurality of flash lamps in stacked relation inserted into the open end of said receptacle and extending to the bottom thereof, the front wall of said receptacle and the adjoining wall of said box provided with alined openings through which the lowermost lamp in the box is adapted to be ejected, lamp gripping means extending from said receptacle adjacent said opening and adapted to guide a lamp to, and frictionally retain it in, a firing position as it is moved from said box, and including contacts for engaging the lamp terminals when the lamp is in firing position; means connecting said contacts into said power supply and including a normally open circuit; a frangible seal covering the opening in said box to retain the lamps therein; a manually operated pusher member mounted on said receptacle to slide from a normally inoperative position to an operative position wherein it engages the lowermost lamp in said stack and pushes it through said openings into firing position and whereupon any lamp already in firing position will be forced therefrom by movement of the succeeding lamp into such position; a door in the rear wall of said box to permit movement of the pusher member transversely of the stack of lamps; a reflector fixed to the front wall of said receptacle in embracing relation with said lamp gripping means and provided with an aperture on its axis alined with said opening in the receptacle wall; a door having a reflecting surface for closing said aperture in the reflector and hinged to move between a normally closed position, wherein its reflecting surface completes the surface of the reflector and the door prevents sympathetic firing of the lamps in said box upon firing of the lamp in firing position, and an open position, to which it is pushed by a lamp being shoved into firing position, a spring-loaded plunger extending up the rear wall of said receptacle, a presser member atop said plunger movable between an operative position, wherein it engages the uppermost lamp in the stack to press downwardly thereon, and an inoperative position, wherein it leaves the open end of said receptacle unobstructed to permit the insertion of a box of lamps therein, the rear wall of said box provided with an elongated slot to permit downward movement of said presser member, and a transparent flash guard detachably connected to and covering the open end of said reflector, said guard including a pocket portion extending below the reflector proper and adapted to catch and retain a plurality of burned lamps as they are ejected from firing position.

2. A flash holder according to claim 1 characterized by the fact that the side walls of said receptacle and the side walls of the lamp package adapted to engage the same are correspondingly inclined so that the box of lamps can only be placed in the receptacle if it is oriented so that its wall having the opening through which a lamp is adapted to pass adjoins the front wall of the receptacle.

3. A package for flash lamps of generally cylindrical shape having substantially spherical ends comprising a rectangular box including front and rear walls defining the width of the box, side walls joining the front and rear walls and defining the depth of the box and end walls defining the length of the box, the dimensions of said walls being such that the box is adapted to contain in a single row a plurality of flash lamps in side-by-side stacked relation, one end of the front wall provided with an opening extending the full width of the box and at least as wide as the diameter of a lamp, a frangible seal covering said opening to prevent the lamps from falling out of the box but adapted to be readily broken when a lamp is pressed thereagainst, the rear wall provided with an opening in alinement with the opening in the front wall which is too small for a lamp to fall out of but is adapted to allow a lamp pusher to enter the box and push a lamp through the opening in the front wall, and said rear wall and the end wall of the box opposite the one adjacent the lamp opening provided with alined and contiguous slots which extend partially across one end and down the rear wall to permit a presser member to extend transversely of the box and engage the uppermost lamp and maintain said engagement as the engaged lamp moves downwardly in the box.

4. A package for flash lamps according to claim 3 and characterized by the fact that the other end of the front wall is also provided with an opening covered by a frangible seal like that at the first-mentioned end, and said rear wall has a second opening alined with this second sealed opening in the front wall to permit entrance of a lamp pusher, and the second end wall of the box provided with a slot extending transversely of the box and alined with the slot in the rear wall, whereby the box of flash lamps can be inserted either end first into a flash holder adapted to its use.

5. A package for flash lamps of generally cylindrical shape having substantially spherical ends comprising a rectangular box including front and rear walls defining the width of the box, side walls joining the front and rear walls and defining the depth of the box and end walls defining the length of the box, the dimensions of said walls being such that the box is adapted to contain in a single row a plurality of flash lamps in side-by-side stacked relation, means at one end of the front wall to permit a lamp at one end of the stack to be pushed sidewise through the front wall and from the box, said means including weakening three sides of one end of the front wall to break under pressure of a lamp thereagainst and transversely scoring the front wall to provide a fold line on which the end of the front wall will hinge like a door when the weakened sides break, the end of the rear wall provided with an opening in alinement with the weakened portion of the front wall through which pressure may be applied to the lowermost lamp in the stack, and said rear wall and the end wall of the box remote from said opening in the rear wall provided with alined and contiguous slots which extend partially across and longitudinally down the rear wall to permit a presser member to extend transversely of the box and to engage the uppermost lamp and maintain said engagement as the engaged lamp moves downwardly in the box.

6. A package for flash lamps according to claim 3, characterized by the fact that the front and rear walls are of different width so that the side walls are inclined, and in transverse cross section the box has a trapezoidal shape rather than a rectangular shape, whereby the box must be placed in a flash holder receptacle with which it is adapted for use with the front and rear walls oriented in a certain way with respect to said flash holder.

7. In a flash holder the combination of a hollow casing adapted to contain an electrical power supply and to serve as a handle; an open-ended flash lamp receptacle atop said casing; a box containing a plurality of flash lamps in stacked relation inserted into the open end of said receptacle and extending to the bottom thereof, the front wall of said receptacle and the adjoining wall of said box provided with alined openings through which the lowermost lamp in the box is adapted to be ejected, lamp gripping means extending from said receptacle adjacent said opening and adapted to guide a lamp to, and frictionally retain it in, a firing position as it is moved from said box, and including contacts for engaging the lamp terminals when the lamp is in firing position; means connecting said contacts into said power supply and including a normally open circuit; a frangible seal covering the opening in said box to retain the lamps therein; a manually operated pusher member mounted on said receptacle to slide from a normally inoperative position to an operative position wherein it engages the lowermost lamp in said stack and pushes it through said openings into firing position and whereupon any lamp already in firing position will be forced therefrom by movement of the succeeding lamp into such position; a door in the rear wall of said box to permit movement of the pusher member transversely of the stack of lamps; a reflector fixed to the front wall of said receptacle in embracing relation with said lamp gripping means and provided with an aperture on its axis alined with said opening in the receptacle wall; a door having a reflecting surface for closing said aperture in the reflector and hinged to move between a normally closed position, wherein its reflecting surface completes the surface of the reflector and the door prevents sympathetic firing of the lamps in said box upon firing of the lamp in firing position, and an open position, to which it is pushed by a lamp being shoved into firing position, a spring-loaded plunger extending up the rear wall of said receptacle, a presser member atop said plunger movable between an operative position, wherein it engages the uppermost lamp in the stack to press downwardly thereon, and an inoperative position, wherein it leaves the open end of said receptacle unobstructed to permit the insertion of a box of lamps therein, the rear wall of said box provided with an elongated slot to permit downward movement of said presser member.

8. In a flash holder the combination of a hollow casing adapted to contain an electrical power supply and to serve as a handle; an open-ended flash lamp receptacle atop said casing adapted to support a plurality of flash lamps in stacked relation therein; the front wall of said receptacle provided with an opening opposite the lowermost lamp of the stack and of a size to permit ejection of the lowermost lamp therethrough; lamp gripping means extending transversely from said receptacle adjacent said opening and adapted to guide a lamp to, and frictionally retain it in, a firing position as it is moved transversely from said stack, and including contacts for engaging the lamp terminals when the lamp is in firing position; means for connecting said contacts into said power supply and including a normally open circuit; manually operated means for pushing the lowermost lamp transversely from said stack through said opening in the front wall of said receptacle and into firing position in engagement with said gripping means, whereupon any lamp already in firing position will be ejected therefrom; a reflector fixed to the front wall of said receptacle in embracing relation with said lamp gripping means and provided with an aperture substantially on its optical axis alined with said opening in said receptacle to permit movement of a lamp into firing position; a hinged door having one reflecting surface and movable from a closed position, wherein it covers the aperture in the reflector and its reflecting surface completes the reflector surface and protects the lamps remaining in said receptacle from being sympathetically fired by a flashing of the lamp in firing position; means normally moving said door to its closed position but permitting free movement of a lamp from the receptacle into firing position; and a transparent flash guard detachably connected to and covering the open end of said reflector, said guard including a pocket portion extending below the reflector proper and adapted to catch and retain a plurality of burned lamps as they are ejected from firing position by movement of new lamps into firing position from said receptacle.

9. In a flash holder the combination of a hollow casing adapted to contain an electrical power supply and to serve as a handle; an open-ended flash lamp receptacle atop said casing adapted to support a plurality of flash lamps in stacked relation therein; the front wall of said receptacle provided with an opening opposite the lowermost lamp of the stack and of a size to permit ejection of the lowermost lamp therethrough; lamp gripping means extending from said receptacle adjacent said opening and adapted to guide a lamp to, and frictionally retain it in, a firing position as it is moved from said stack, and including contacts for engaging the lamp terminals when the lamp is in firing position; means for connecting said contacts into said power supply and including a normally open circuit; manually operated means for pushing the lowermost lamp from said stack through said opening and into firing position in engagement with said gripping means, whereupon any lamp already in firing position will be ejected therefrom; a box containing a plurality of lamps in stacked relation inserted in the open end of said receptacle, said box having an opening in the side wall adjacent one end of the box which is adapted to come into alinement with the opening in said receptacle when the box is fully inserted therein; a frangible seal over said opening in the box wall for retaining said lamps in the box and adapted to be broken when the lowermost lamp is pressed outwardly thereagainst, and an opening in the opposite wall of said box through which said manually operated lamp pushing means is adapted to enter and engage and push the lowermost lamp from said box; a reflector fixed to the front wall of said receptacle in embracing relation with said lamp gripping means and provided with an aperture alined with said opening in said receptacle to permit movement of a lamp into firing position; and a transparent flash guard detachably connected to and covering the open end of said reflector, said guard including a pocket portion extending below the reflector proper and adapted to catch and retain a plurality of burned lamps as they are ejected from firing position by movement of new lamps into firing position from said receptacle.

10. In a flash holder adapted for use with flash lamps having a generally cylindrical body portion terminating in spherically shaped ends having a metal drop-like terminal on the tips thereof, the combination of a hollow casing adapted to contain an electrical power supply and to serve as a handle; an open-ended flash lamp receptacle atop said casing adapted to support a plurality of flash lamps in stacked relation therein; the front wall of said receptacle provided with an opening opposite the lowermost lamp of the stack and of a size to permit ejection of the lowermost lamp therethrough; lamp gripping means extending transversely from said receptacle adjacent said opening and adapted to guide a lamp to, and frictionally retain it in, a firing position as it is moved transversely from the stack, and comprising a pair of like inherently resilient metal fingers fixed at one end to said receptacle at opposite sides of said opening and extending into said reflector, the free ends of said fingers being provided with axial slots and normally spaced apart a distance slightly less than the over-all length of said lamps, whereby as a lamp is moved into firing position the fingers are spread and the slotted ends frictionally embrace said metal terminals to provide good electrical contact and hold the lamp against movement in a direction transversely of said fingers, that portion of the fingers intermediate their ends being formed to engage the spherical ends of the lamp and guide the lamp during its movement so that the metal terminals on the ends thereof will be properly engaged by the slotted ends of said fingers; means for connecting said fingers into said power supply and including a normally open circuit; manually operated means for pushing the lowermost lamp from said stack through said opening and into firing position in engagement with said gripping means, whereupon any lamp already in firing position will be ejected therefrom; a reflector fixed to the front wall of said receptacle in embracing relation with said lamp gripping means and provided with an aperture alined with said opening in said receptacle to permit movement of a lamp into firing position; and a transparent flash guard detachably connected to and covering the open end of said reflector, said guard including a pocket portion extending below the reflector proper and adapted to catch and retain a plurality of burned lamps as they are ejected from firing position by movement of new lamps into firing position from said receptacle.

11. In a flash holder adapted for use with flash lamps having a generally cylindrical body portion terminating in spherically shaped ends having a metal drop-like protuberance on the tips thereof, and having one of the lamp filaments connected to one of these protuberances and the other filament connected to a band-like contact encircling the spherical portion at one end of the lamp; the combination of a hollow casing adapted to contain an electrical power supply and to serve as a handle; an open-ended flash lamp receptacle atop said casing adapted to support a plurality of flash lamps in stacked relation therein; the front wall of said receptacle provided with an opening opposite the lowermost lamp of the stack and of a size to permit ejection of the lowermost lamp therethrough; lamp gripping means extending transversely from said receptacle adjacent said opening and adapted to guide a lamp to, and frictionally retain it in, a firing position as it is moved from said stack, and comprising a pair of resilient metal U-shaped contacts fixed at the open end to said receptacle at opposite sides of said opening, the arms of said U-shaped contacts spaced apart and formed to engage that portion of the spherical ends of the lamp carrying said band contact to guide the lamp in its movement and form an electrical connection with said band contact; a pair of resilient metal contact fingers fixed at one end to said receptacle at opposite sides of said opening between, and in spaced relation with, the arms of said U-shaped contacts, the other end of said contact fingers terminating in slotted ends adapted to engage the drop-like metal protuberances on the end of a lamp when moved to firing position; and means for connecting both of said U-shaped connectors to one side of a power supply and said contact fingers to the other side of said power supply; manually operated means for pushing the lowermost lamp from said stack through said opening and into firing position in engagement with said gripping means, whereupon any lamp already in firing position will be ejected therefrom; a reflector fixed to the front wall of said receptacle in embracing relation with said lamp gripping means and provided with an aperture alined with said opening in said receptacle to permit movement of a lamp into firing position; and a transparent flash guard detachably connected to and covering the open end of said reflector, said guard including a pocket portion extending below the reflector proper and adapted to catch and retain a plurality of burned lamps as they are ejected from firing position by movement of new lamps into firing position from said receptacle.

(References on following page)

References Cited in the file of this patent

UNITED STATES PATENTS

| | | | |
|---|---|---|---|
| 820,476 | Crocker | May 15, | 1906 |
| 1,118,592 | Shipley | Nov. 24, | 1914 |
| 1,210,834 | Poynter | Jan. 2, | 1917 |
| 1,973,361 | Smally | Sept. 11, | 1934 |
| 2,157,476 | Brodesser | May 9, | 1939 |
| 2,186,527 | Harris | Jan. 9, | 1940 |
| 2,294,979 | Goldberg | Sept. 8, | 1942 |
| 2,332,470 | Richards | Oct. 19, | 1943 |
| 2,485,404 | Noel | Oct. 18, | 1949 |
| 2,539,819 | Domnick | Jan. 30, | 1951 |
| 2,672,039 | Schwartz et al. | Mar. 16, | 1954 |
| 2,754,408 | Bolsey | July 10, | 1956 |

FOREIGN PATENTS

| | | | |
|---|---|---|---|
| 233,180 | Great Britain | May 7, | 1925 |
| 846,218 | France | June 5, | 1939 |